R. H. POOLER & W. T. JONES,
Assignors to the WASHBURN & MOEN MANUFACTURING CO.
Wire Fence Barb Former.
No. 9,543. Reissued Jan. 25, 1881.
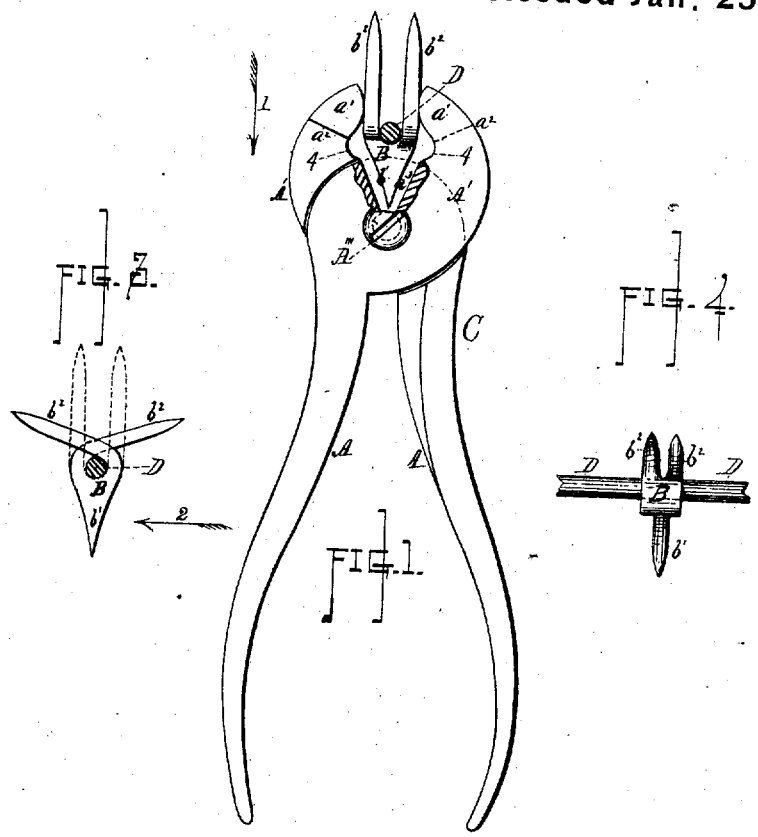
Witnesses;
W. Hector Gale
Alonzo P. Whitney
Inventors;
Reuben H. Pooler
William T. Jones
N. PETERS, PHOTO-LITHOGRAPHER, WASHINGTON, D. C.

UNITED STATES PATENT OFFICE.

RHEUBIN H. POOLER AND WILLIAM T. JONES, OF SERENA, ILLINOIS, ASSIGNORS TO THE WASHBURN & MOEN MANUFACTURING COMPANY, OF WORCESTER, MASSACHUSETTS.

WIRE-FENCE-BARB FORMER.

SPECIFICATION forming part of Reissued Letters Patent No. 9,543, dated January 25, 1881.

Original No. 174,435, dated March 7, 1876. Application for reissue filed May 1, 1878.

*To all whom it may concern:*

Be it known that we, RHEUBIN H. POOLER and WILLIAM T. JONES, both of Serena, in the county of La Salle and State of Illinois, have invented a new and useful Improvement in Pinchers or Devices for Applying Barbs to Wire-Fences, of which the following is a full, clear, and exact description, reference being had to the accompanying drawings, forming a part of this specification, and in which—

Figure 1 represents a side view of our improved device, a part being broken away to show the construction more fully, a blank for a three-prong barb being represented in place ready to be applied or secured by means of the mechanism constituting the subject-matter of our present invention. Fig. 2 represents an end view, looking in the direction of arrow 1, Fig. 1, before the blank barb is applied or placed in position, as shown in Fig. 1. Fig. 3 represents a three-prong barb after it has been applied to the main fence-wire, the dotted lines illustrating the positions of two of the barbs before the barb is secured to the main fence-wire; and Fig. 4 represents a side view, looking in the direction of arrow 2, Fig. 3, the dotted lines in Fig. 3 not being shown in Fig. 4.

Similar letters of reference indicate corresponding parts.

In the drawings, the parts marked A A represent the two parts by which the barb-compressing jaws A′ A′ are operated. The parts A′ A′ are pivoted or secured together by means of a bolt or pivot, A‴. The barb-compressing jaws A′ A′ are recessed, cut away, or halved upon their inner sides, as shown at $a'$, for the purpose of permitting them to pass each other, and so that each jaw may have a shoulder, $a^2$, to receive the respective barb ends, as will be hereinafter described. The barb-compressing jaws are recessed or cut away upon their inner edges, as indicated at 4, to receive the main fence-wire. They are also cut away or formed with triangular notches $a^3$, the notches $a^3$ of the two jaws forming a triangular socket to receive one of the points or prongs of the barbs B, which may be made of malleable-iron or cut out, or forged in a drop-press, with a single prong, $b'$, upon one side and two parallel points or prongs upon the other side, as shown in dotted and full lines, Fig. 3. The two parallel prongs $b^2$ of the barbs B should be made with a slight offset in opposite directions, to bring them in line with the points $a'$ of compressing-jaws A′ of the device. When the staple ends $b^2$ are pressed so as to pass each other around the fence-wire, as indicated in Fig. 3, they are forced down so as to rest upon the supporting-shoulders $a^2$ of the apparatus. By this arrangement they are caused to "set," and thereby hug firmly the main wire, while at the same time a uniformity of position is secured.

In applying three-prong barbs to fence-wire the single prong or point $b'$ is inserted in the cavity $a^3$ of the device with the center edge of each parallel prong or point $b^2$ resting against a jaw-point, $a'$, of the device, as indicated in Fig. 1 of the drawings. The barb B and barbing-pinchers or wire-fence-barb former C are then made to straddle the fence-wire D, as shown in Fig. 1, and the barb-compressing jaws A′ A′ of the device are then closed, and by which operation the parallel prongs or points $b^2$ are forced across the wire in opposite directions, and are clamped about and secured to the wire, as indicated and shown in Figs. 3 and 4 of the drawings. The jaws are then opened and the device removed, leaving the barb firmly attached or secured to the wire.

Those skilled in the art to which our invention belongs will perceive that by our invention the points of a barb standing or made in staple shape can be quickly and readily locked about the main fence-wire, so that their points will stand in opposite directions, as indicated in Fig. 3.

Having thus described our device for applying barbs to fence-wire, what we claim therein as new and of our invention, and desire to secure by Letters Patent, is—

1. The combination of two jaws, permanently united in one device and arranged to rotate toward and to pass each other, with suitable means for operating the jaws for the purpose of forcing the ends of a barb about a fence-wire in the operation of barbing wire for fencing purposes.

2. As an improved article of manufacture, a wire-fence-barb-attaching device, provided with two hinged barb bending and attaching jaws, with suitable means for operating the same, substantially as and for the purposes set forth.

3. In a device for applying barbs to fence-wire, the combination of two clamping and bending jaws, with suitable means for operating them, and barb-supporting shoulders, for the purposes stated.

4. The combination of the jaws A′ A′, having a triangular socket, with suitable mechanism for operating the same, substantially as and for the purposes set forth.

RHEUBIN H. POOLER.
WILLIAM T. JONES.

Witnesses:
W. HECTOR GALE,
ALMON V. WHITNEY.